United States Patent [19]
Anderberg

[11] 3,983,590
[45] Oct. 5, 1976

[54] SAFETY DEVICE FOR A LOADING BRIDGE OR WALKWAY

[75] Inventor: Nils-Eric Anderberg, Lund, Sweden

[73] Assignee: Fabriksmontering I Trellebrog AB, Sweden

[22] Filed: May 16, 1975

[21] Appl. No.: 577,992

[30] Foreign Application Priority Data
May 20, 1974 Sweden .............................. 7406652

[52] U.S. Cl. ................................................ 14/69.5
[51] Int. Cl.² ........................................ B65G 11/00
[58] Field of Search ................................... 14/71 A

[56] References Cited
UNITED STATES PATENTS

| | | | |
|---|---|---|---|
| 3,038,185 | 6/1962 | Moore | 14/71 |
| 3,358,308 | 12/1967 | Henchbarger | 14/71 |
| 3,543,318 | 12/1970 | Tushim | 14/71 |
| 3,599,262 | 8/1971 | Carder | 14/71 |
| 3,665,536 | 5/1972 | Jackson | 14/71 |
| 3,683,440 | 8/1972 | Xenakis | 14/71 |
| 3,694,724 | 9/1972 | Eggert | 14/71 |

Primary Examiner—Nile C. Byers
Attorney, Agent, or Firm—Bucknam and Archer

[57] ABSTRACT

A safety device for a loading bridge or walkway at which aircraft are parked for loading and unloading of passengers and cargo through an open door in the aircraft. To prevent the open door from striking the floor of the loading bridge or walkway and thus from being damaged when the position of the aircraft is lowered at fuelling and loading operations, a sensor is provided in the region of the part of the loading bridge facing the aircraft and beneath the open door. When struck by the door the sensor activates an actuator which lowers the bridge a short distance.

6 Claims, 5 Drawing Figures

SAFETY DEVICE FOR A LOADING BRIDGE OR WALKWAY

The invention relates to a safety device in loading bridges or walkways at which aircraft are parked for loading and unloading of passengers and cargo through an open door in the aircraft, said device serving to prevent the open door from striking the floor of the loading bridge and thus from being damaged when the position of the aircraft is lowered at fuelling and loading operations.

Despite the fact that aircraft loading bridges should be and are provided with safety devices serving the above purpose, it sometimes happens that due to deficiencies in the construction and function of the safety devices the bridge is not lowered so as to match the lowered position of the aircraft. Should attention not be paid to this, it easily happens that the open door of the aircraft strikes the floor of the loading bridge and is damaged with ensuing heavy costs of repairing the aircraft and having it at standstill. Moreover, a substitute aircraft must be procured, which is also time-consuming and expensive.

A prior art device serving the above purpose usually has two rollers which roll on the aircraft fuselage and which are each mounted at the free end of the piston rod of a cylinder arranged at the underside of the loading bridge. According as the position of the aircraft is lowered at fuelling or loading, the piston rod is pushed farther into the cylinder as the associated roller rolls on the convex aircraft fuselage. When the piston rod is thus pushed into the cylinder an actuating means is activated for lowering of the bridge.

In another prior art apparatus serving the purpose indicated in the foregoing, there are also provided two rollers which roll on the aircraft fuselage and which are connected in some suitable way to the loading bridge. By their rolling movement these rollers activate an actuating means for lowering of the bridge.

The use of rollers for sensing the height position of an aircraft is associated with several disadvantages. Firstly, different aircraft fuselages are of different convexity both longitudinally and vertically, for which reason the initial position of the rollers has to be adjusted at each parking manoeuver with due regard to said different convexity. Secondly, the aircraft when parked will seldom stop at exactly the same point relative to the loading bridge, and also for this reason the initial position of the rollers has to be adjusted in order to activate the actuating means correctly. Thirdly, the aircraft fuselage precisely in the region where the rollers shall roll may have projecting or countersunk details which, on the one hand, can be damaged when they are struck by the rollers and, on the other hand, prevent the rollers from functioning in the contemplated manner. Fourthly, it often happens that, after being used for some time, the rollers jam due to the weather conditions, and therefore the rollers will not function satisfactorily and may even under certain circumstances damage the aircraft fuselage.

The main object of the invention is to provide a safety device of the type outlined in the foregoing, which does not suffer from the above disadvantages, and which is of simple construction and reliable function.

Another, but not the less essential object is to provide a safety device which operates with another base reference than the convexity of the aircraft fuselage.

These objects are achieved in a novel and very elegant way with the aid of sensing means positioned in the region of the part of the loading bridge or walkway facing the aircraft and beneath the open aircraft door, and said sensing means, when struck by the door, will activate an actuating means for lowering of the bridge.

A preferred embodiment of the invention is more fully described hereinbelow and with reference to the accompanying drawings in which.

Figure 1:
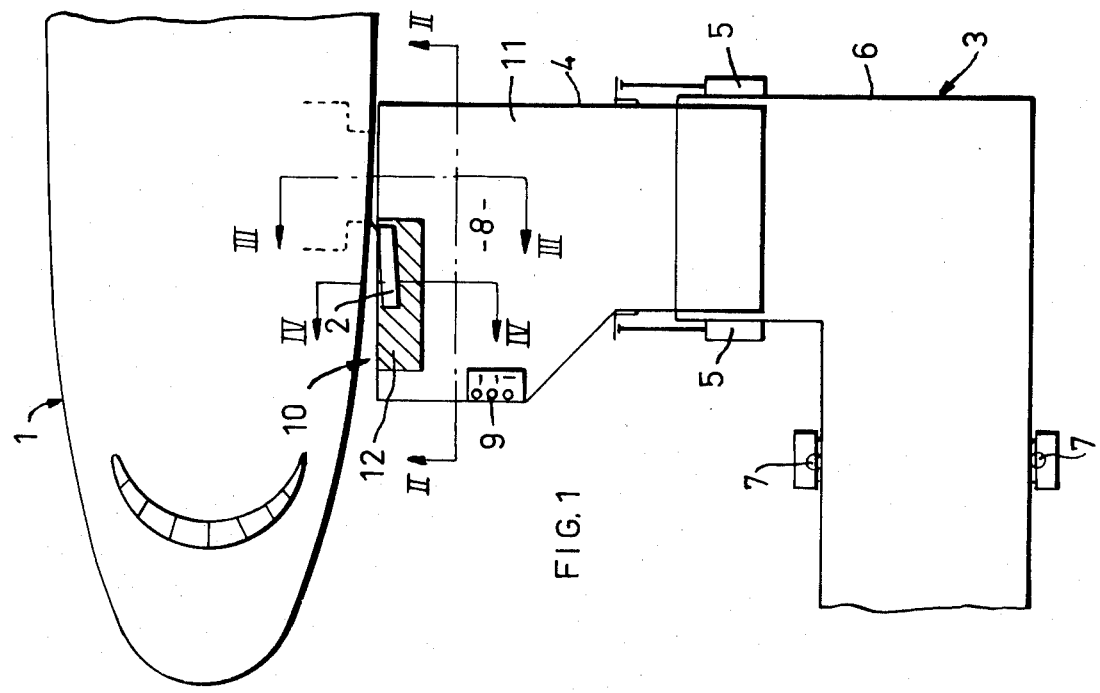
FIG. 1 is a diagrammatic top plan view of the front portion of an aircraft and the outer portion of an aircraft loading bridge or walkway at which the aircraft is parked and the roof of which has been removed for greater clarity.

As already mentioned, FIG. 1 is a diagrammatic top plan view of the front portion of an aircraft 1, in the present instance an airliner, with a door 2 which can be opened in the manner illustrated to permit passengers to embark and disembark via a loading bridge or walkway generally designated 3.

Figure 2:
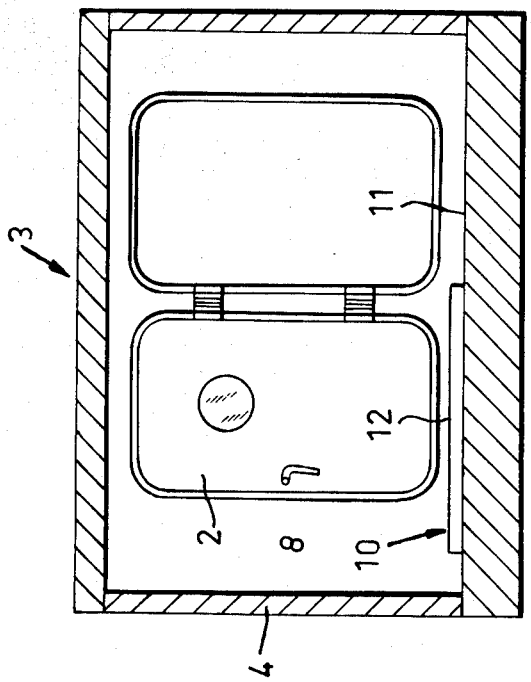
FIGS. 2, 3 and 4 are diagrammatic sections on the lines II—II, III—III and IV—IV in FIG. 1.
Figure 3:
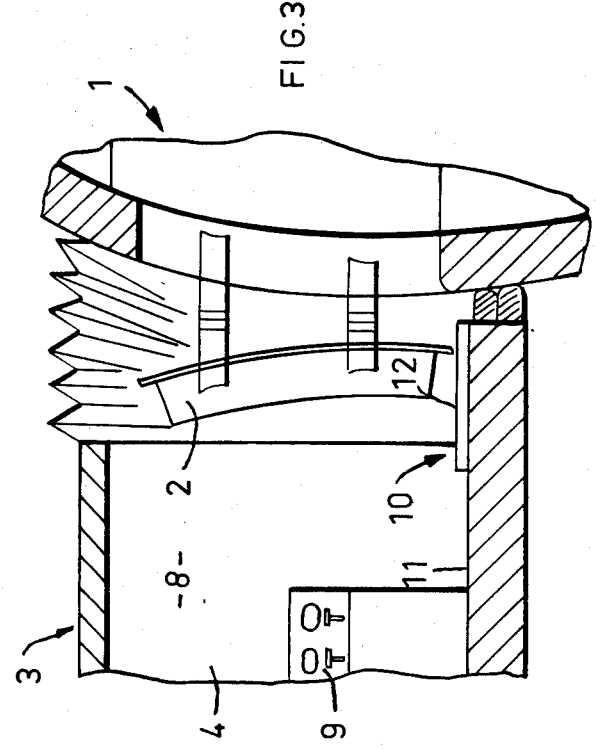

In the illustrated preferred embodiment, the walkway 3 comprises a telescoping portion 4 which by suitable means, such as hydraulic jacks 5, is respectively telescopically extensible from and retractable into a vertically movable portion 6 in order to be moved up to the door 2 of the parked aircraft 1, as shown in FIGS. 1–3. The vertically movable portion 6 of the walkway 3 is manoeuvered for mating with the level of the door 2 by such means as hydraulic jacks 7, and is connected to a stationary portion (not shown) which in turn is associated with an embarkation/disembarkation gate.

The part of the walkway of major interest in this context, namely the telescoping portion 4, has a cabin 8 with a control panel 9 for permitting manual manoeuvring of the walkway 3, and a safety device 10 according to the invention.

As already mentioned, the safety device 10 serves the task of preventing the door 2 which is open to permit loading and unloading of the aircraft 1, from striking the floor 11 of the walkway 3 or, more precisely, of the telescoping portion 4 and thus from being damaged with the ensuing disadvantages outlined in the foregoing. According to the invention, the safety device 10 is in form of a sensing means positioned in a region of the part of the walkway 3 facing the aircraft 1 and beneath the open door 2, which sensing means when struck by the door 2, activates the jacks 7 for lowering of the walkway 3.

In the illustrated embodiment the sensing means 10 is situated at the floor 11 of the walkway 3 and at a higher level than the floor 11. However, nothing prevents the sensing means from being countersunk in the floor. The essential thing is that it is situated beneath the open door 2. The sensing means comprises a rectangular plate 12 of some suitable material, for instance sheet metal, with a rubber mat vulcanized thereto. The plate 12 rests on two means extending longitudinally of the plate and responsive to loading, in the form of pressure wave contacts 13. These contacts are made of profiled rubber and have an elevated portion 14 on which the plate 12 rests and beneath which there is provided a through passage 15. At one end, the through passage 15 is closed by means of a plug 16 and at its other end it is connected to a signal line 17 which leads to a converter 18. The passage 15 contains air which, when the door 2 places the plate 12 under load and thus depresses the elevated portion 14 so that the cross-sectional area of the passage 15 will be reduced, is compressed to generate a pressure wave signal which is impressed upon the converter 18 through the signal line 17.

Figure 5:
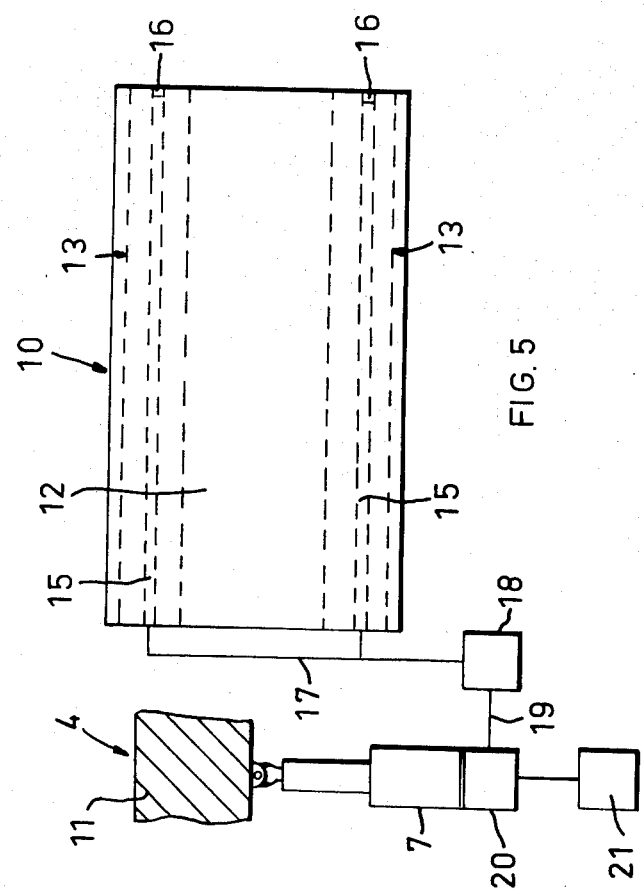
FIG. 5 is a diagrammatic top plan view of the safety device according to the invention with associated connection diagram for vertically manoeuvring the loading bridge.
Figure 4:
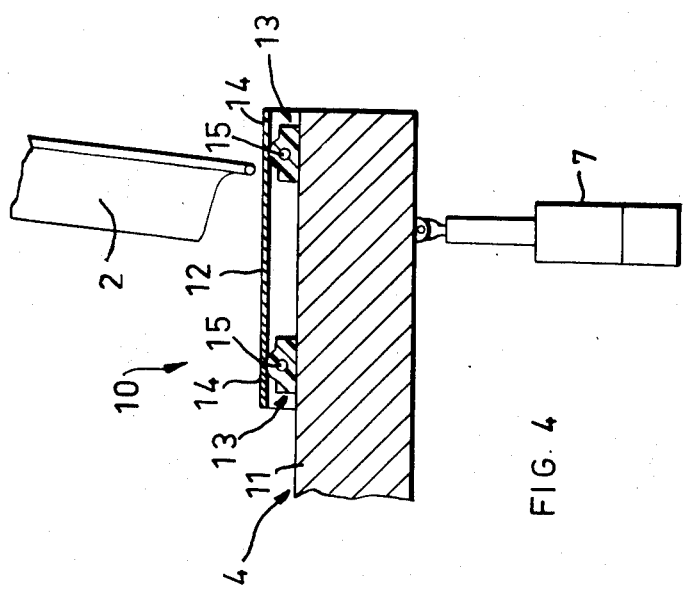

In the converter 18 the pressure wave signal is converted into an electric operating signal which via an operating line 19 is impressed upon a servo valve 20. The servo valve 20 in turn operates the associated jack 7 by permitting hydraulic oil to escape therefrom so that the walkway 3 is lowered. The arrangement preferably is such that the walkway 3, at each activation of the jacks 7, is lowered a definite distance and is then stopped. Since the jacks 7, as mentioned earlier, shall also be able to elevate the walkway 3 they are connected to a pump 21 having an outlet. It should be observed that for a better understanding of the function of the invention, FIGS. 4 and 5 show the jack 7 connected to the floor 11 of the walkway 3 at the telescoping portion 4 proper. As will appear from FIG. 1, the jacks 7 are in fact connected to the vertically movable portion 6 of the walkway 3.

In an alternative embodiment (not shown) means responsive to a load applied by the open door 2 may be resistance strain gauges providing an electric activation of the servo valve 20, thus dispensing with the converter 18.

Of course, the invention is not restricted to the embodiment described in the foregoing and illustrated in the drawings but can be modified in several ways within the spirit and scope of the claims. It will thus be realized that the safety device 10 can operate on any suitable principle whatever, either pneumatic, hydraulic or electric. The essential thing is that the safety device 10, when struck by the open door, activates the jacks 7 so that the loading bridge or walkway is lowered and the door will be freed from any engagement with said walkway.

What I claim and desire to secure by Letters Patent is:

1. In loading bridges at which aircraft are parked for loading and unloading of passengers and cargo through an open door in the aircraft, a safety device serving to prevent the open door from striking the floor of the loading bridge and thus from being damaged when the position of the aircraft is lowered at fuelling and loading operations, comprising at least one sensing means position in the region of the part of the loading bridge facing the aircraft and beneath the open door thereof, said sensing means, comprising a plate which shall be struck by the door, and at least one means responsive to load, the plate resting on said means, said means when the plate is loaded, activating an actuating means for lowering of the loading bridge.

2. A safety device as claimed in claim 1, in which the sensing means is situated at the floor of the loading bridge.

3. A safety device as claimed in claim 1, in which the sensing means is situated in the floor of the loading bridge.

4. A safety device as claimed in claim 1, in which the sensing means is at a higher level than the floor of the loading bridge.

5. A safety device as claimed in claim 1, in which the means responsive to load is a pressure wave contact.

6. A safety device as claimed in claim 4, in which the means responsive to load is a resistance strain gauge.

* * * * *